June 30, 1936.    M. TIBBETTS    2,045,886

BRAKE OPERATING MECHANISM

Filed June 10, 1931

Inventor

Mallon Tibbetts

Patented June 30, 1936

2,045,886

UNITED STATES PATENT OFFICE 2,045,886

BRAKE OPERATING MECHANISM

Milton Tibbetts, Detroit, Mich., assignor to Packard Motor Car Company, Detroit, Mich., a corporation of Michigan Application June 10, 1931, Serial No. 543,404

13 Claims. (Cl. 188—196)

This invention relates to motor vehicles and more particularly to their brake mechanisms.

In such mechanisms, it is conventional practice to provide brakes at the vehicle wheels which are operated from a lever, usually a pedal, through suitable connecting mechanism. This mechanism may, and usually does, include a rock shaft having a lever arm connected by a rod or other suitable link to the operating lever, and having lever arms connected by other rods or links to actuating rock shafts at the brakes. The brakes themselves usually consist of bands or shoes which are contracted or expanded into contact with brake drums on the vehicle wheels.

As the permissible throw of the operating pedal is limited, it is necessary that the clearance between the shoes and the drum be quite small, and that the back-lash or play in the connecting mechanism be a minimum, in order that as little of the movement of the lever as possible be employed to take up this clearance and lost motion.

One of the objects of the present invention is to provide a novel brake system which improves the present systems by using a smaller portion of the pedal travel to take up this lost motion and clearance.

Another object of the invention is to provide means for automatically taking up slack in a brake system with negligible effort on the operator's part.

A further object of the invention is to provide a power mechanism for a brake system arranged primarily to take up the play in the system, or at most to operate the connections no further than is necessary to accomplish the take-up of clearance.

Another object is to provide a brake system in which practically the full travel of the brake operating lever is used to effect the application of the brakes.

Other objects of the invention will appear from the following description taken in connection with the drawing forming a part of this specification, and in which.

Figure 1:
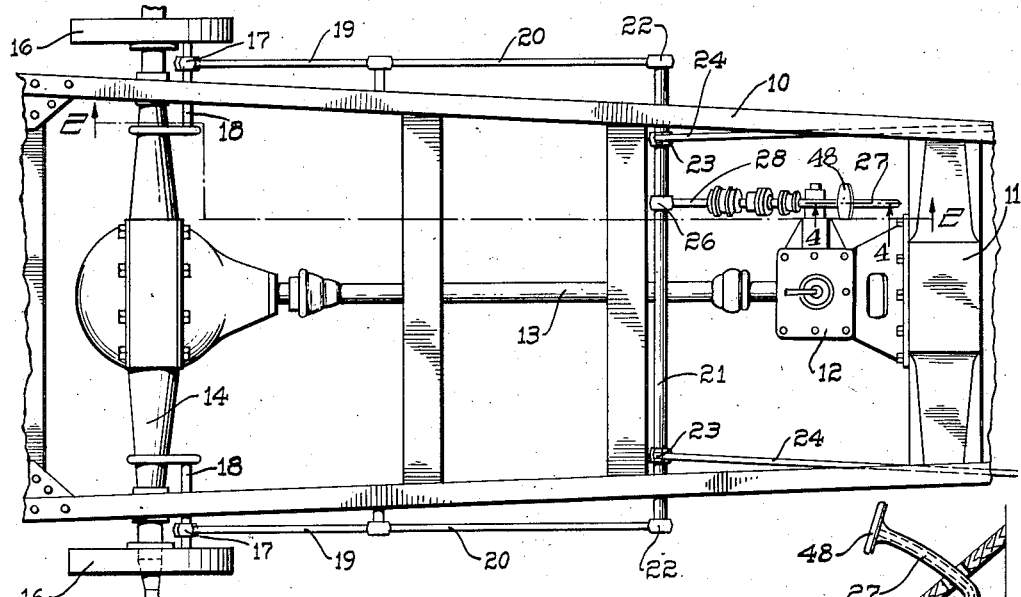
Fig. 1 shows a portion of a motor vehicle with the brake mechanism of this invention mounted thereon.
Figure 2:
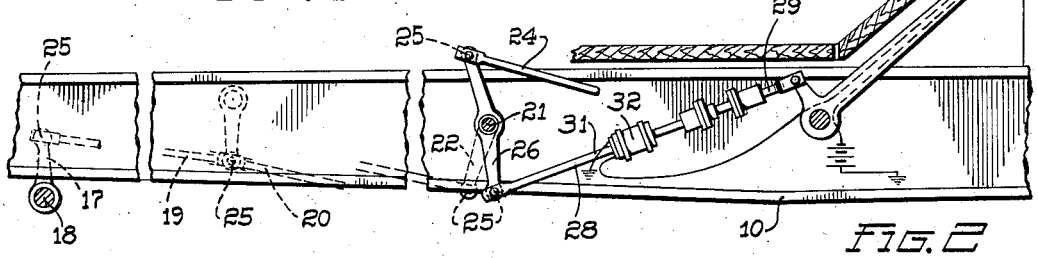
Fig. 2 is a sectional view substantially on line 2—2 of Fig. 1.

Referring to the drawing, 10 represents a motor vehicle frame supporting a motor 11 and a transmission 12, which latter is connected by a propeller shaft 13 to the rear axle in the housing 14. The axle housing supports the frame in the usual fashion by springs, not shown. On the outer ends of the axle housing are mounted the vehicle brakes housed in conventional brake drums 16.

The brakes are operated by the lever arms 17 on rock shafts 18, which arms are in turn actuated by brake rods 19 and 20, placed under tension by the rotation of a cross shaft 21 and its depending levers 22. The brake cross shaft 21 controls the rear brakes in the manner outlined, and also controls the front brakes through similar mechanism which includes levers 23 and the connected front brake rods 24.

The force for rotating or oscillating the main cross shaft 21 is applied to arm 26 thereon by a pedal 27 through a pull rod 28.

It will be noticed that all the rods mentioned are under tension and, therefore, may be relatively light. There are, moreover, several joints 25 of the usual exposed clevis and pin type between the various levers and arms. These several joints, and the various cooperating parts of the brakes themselves, form quite a long train of connections in which there is more or less looseness which must be taken up before the brake shoes are actually applied to the brake drums.

Since pedal travel is necessarily limited, the problem in brake design is to get as much leverage as possible within that travel, and consequently every inch of pedal travel that is used to take up slack is wasted so far as brake application is concerned. If too much play is present, the brakes are either insufficiently applied by the full travel of the pedal, or the pedal pressure is excessively high. This latter is a serious objection. It is evident, therefore, that some means is desirable for making the full travel of the pedal effective at the brakes.

Figure 3:
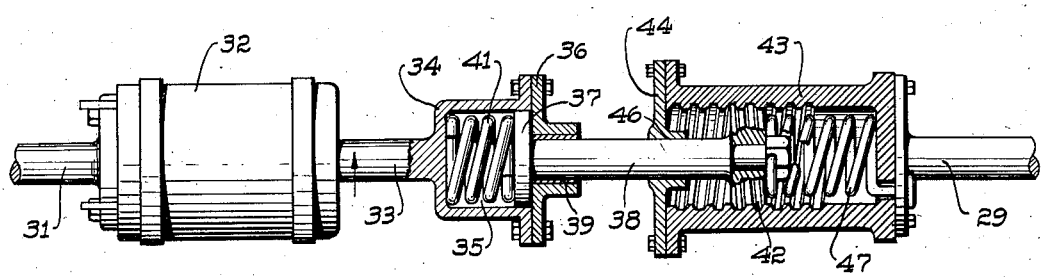
Fig. 3 is an enlarged view, partly sectioned, of a power mechanism employed in the system.

To this end, as a means of solving the problem, the rod 28 is preferably formed of a plurality of aligned sections which are associated to permit the contracting of the rod as a whole. As shown in Fig. 3, the rod 28 includes an end section 29 which is attached at one end to the brake pedal and another end section 31 which is attached at one end to the lever arm 26 on the main cross shaft, such attachments being of the usual clevis and pin type which prevent rotation of the sections about their axes. Secured to the other end of the shaft section 31 is a small motor 32, operated by electricity, having an extended shaft 33 formed with an enlarged portion 34 providing a chamber 35 which is closed at its end by the cover plate 36. The inner face of such cover plate forms one face of a friction clutch.

The rod 28 further includes a clutch section having a disk 37 within the chamber 35 and mounted on a shaft 38 which extends through and is guided by bushing 39 in the cover plate 36. Within the chamber 35 is a spring 41 which is under sufficient initial compression to transmit as much torque to the shaft 38 as may be required It will be seen that the disk 37 forms one part of the clutch while the inner face of the cover 36 forms the other part of the clutch.

The rod 28 also includes another section which connects the clutch shaft with the rod section 29. Secured to the end of the rod section 29 is a cylindrical casing 43 having a cover plate 44 attached thereto, and the clutch shaft extends through a bearing 46 formed in such cover plate. Upon the end of the clutch shaft 38, within the cylindrical casing 43 is fixed a gear 42 having external helical teeth which mesh with an internal thread on the wall of the cylindrical casing 43. The coil spring 47 is arranged within the cylindrical casing and is attached to an end wall thereof at one end and to the gear 42 at the other end. Upon rotation of the gear the coil spring will be twisted and at the same time either stretched or compressed and thus it will be loaded for the purpose to be described.

Energizing the electric motor, in a manner to be described, causes it to turn in the direction indicated by the arrow in Fig. 3 which will turn the gear 42 through means of the clutch mechanism associated with the motor shaft and will pull the two rod sections 29 and 31 toward each other. This movement will continue until the resistance thereto is sufficient to overcome the clutch resistance, at which time the clutch will begin to slip and will continue to do so until the current is switched off. The strength of the clutch spring is made sufficient to enable the clutch to transmit the initial torque and after that the axial tension on the clutch shaft, caused by the resistance of the brake system, will provide sufficient pressure on the clutch facing to accomplish the desired take up in the brake mechanism between rod 29 and the brakes.

Relative rotation between the gear and the casing in the direction shown by the arrow will, as before mentioned, cause the spring 47 to be compressed and twisted, thus loading it so that it will be capable of reversing the rotation of the gear when the motor switch has been opened, and will thus force the two rods 29 and 31 apart. This movement between the rods 29 and 31 permits of quite large clearances in the entire brake system, particularly in the shoe and drum relationship. The present day brake shoes, to have satisfactory operation, must be adjusted against the brake drums within limits which are something less than ten-thousandths of an inch. With a mechanism provided which results in more movement at the brakes than is possible with the conventional linkage, it is thus possible to increase the permissible variation in brake limits, thus greatly reducing the cost of manufacturing and assembly operations.

The application of electric current is controlled by a switch located at any convenient point where it may be readily operated by any movement likely to be made by the operator just prior to his wishing the brake slack to be taken up. I have found the brake pedal to be a very convenient place on which to locate the switch.

Figure 4:
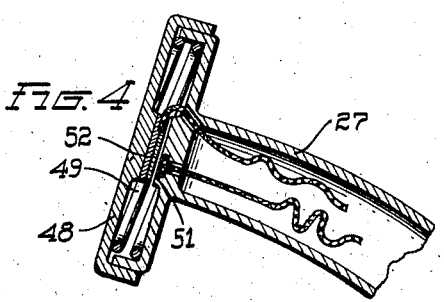
Fig. 4 is an enlarged section on line 4—4 of Fig. 1.

As illustrated in Fig. 4, the pedal pad 48 is spring-mounted, the spring 49 serving to hold the two switch contact surfaces 51 and 52 apart, one of which, 52, is mounted on an insulating base to prevent short circuiting. From these contacts one wire is run to the battery and then to the ground, and the other to the electric motor and from there on to the ground.

It will thus be seen that the complete cycle of operation is as follows: the operator when pressing against the pedal first energizes the electric motor, which automatically takes up, in the manner described, the clearance and lost motion in the brake system and, upon the application of further pressure, then applies the brakes. When the rods are pulled together as far as the torque transmitted by the clutch will permit, the clutch will slip and the motor will continue to revolve, thus preventing the rods from separating by keeping a constant turning force on clutch shaft and gear. When the switch controlling the motor is opened, the spring 47, previously wound up, is free to unwind, thus rotating the gear 42 and the motor shaft 33 in a direction opposite to the arrow, and thereby moving the shafts to their extended positions.

Because this is a take-up device rather than a power booster, compactness and light weight may be achieved by dispensing with the more usual large and cumbersome booster, the purpose of which is to provide the physical effort necessary to move the brake pedal to its extreme position. My invention will render mechanical power for this purpose unnecessary by promoting more efficient pedal movement, and in so doing accomplishing the objects set forth.

The friction clutch slipping torque can be set by any adjustment which may prove, in a particular case, desirable to provide, at any desired value depending upon conditions of the linkage, so that it will do no more than take up play.

It will be understood that various forms of the invention other than those described above may be used without departing from the spirit or scope of the invention.

Having thus described my invention, what I claim and desire to secure by Letters Patent is:

1. In a brake system, a sectional brake pedal, a brake linkage, automatic means forming a section in the linkage to take up initial play therein, said automatic means being made effective by initial pedal movement, and means for automatically releasing the take-up means subsequent to brake release.

2. In a brake system, a brake, a brake pedal, and brake operating connections including a telescoping brake rod and power means associated therewith to take up lost motion in the connections prior to movement of the brake pedal, said means comprising an electrically operated motor and a slipping clutch.

3. In a motor vehicle, a brake, a brake lever, operating mechanism between the brake and the lever including a plurality of relatively movable aligned sections, one of said sections comprising automatic means associated with the lever for adjusting one of the sections relative to the others prior to brake application and a pedal connected with one of the sections, the movement of the pedal controlling the automatic means.

4. In a motor vehicle, a brake, brake operating mechanism including a plurality of sections connected to apply said brake upon application of force thereto, and power means mounted on one of the sections for taking up play in the brake operating mechanism, said power means being operable independently of the operation of said mechanism for applying the brake.

5. In a brake mechanism, a brake, a brake lever, power control means, and operating mechanism between the brake and the lever including a plurality of relatively movable sections comprising a motor and a clutch, two of said sections being telescopically related, said control means energizing the motor to telescope the related sections prior to movement of the brake lever, and said clutch permitting over run of the motor thereafter.

6. In a motor vehicle, a brake, a brake lever, mechanism connecting the brake and the lever comprising a plurality of relatively movable sections, one of said sections comprising power means for relatively moving the sections to take up slack therein after initial movement but prior to movement of the lever to brake applying position, and automatic means for returning the sections to extended relation after completion of the brake application.

7. In a brake mechanism, a brake, a pedal, a co-extensive operating mechanism between the brake and the pedal, a portion of said mechanism including power means, said power means comprising a gear, a helically threaded member, and a motor, said motor being adapted to create relative movement between the gear and the thread and thereby take up play in the operating mechanism upon application of pressure against the pedal.

8. In a brake mechanism, a brake, a brake lever, relatively movable sections, a motor, said motor being adapted to take up play between the sections prior to movement of the lever, and a clutch driven by the motor, said clutch being designed to slip when the take-up is accomplished.

9. In a motor vehicle, a brake, brake operating mechanism, a sectional rod means connected to actuate said mechanism, said rod means including an intermediate power section operable to take up slack in the mechanism, and an actuating pedal connected with the rod means, the initial movement of said pedal controlling the slack take-up movement of said power section.

10. In combination, brake operating mechanism comprising a brake lever, relatively movable telescoping sections, and a motor, said motor being adapted to telescope the sections; and control means on the lever adapted to energize the motor.

11. In a control mechanism, operating mechanism comprising an adjustable rod structure having power means forming a section thereof and operative to take up slack, an element operative to actuate the rod means, and means actuated by the element for controlling the power means, the initial movement of said element from a position of rest actuating the control means to make the power means effective.

12. In a control mechanism, operating mechanism comprising an adjustable rod structure having power means forming a section thereof and operative to take up slack, an element operative to actuate the rod means, and electric means actuated by the element for controlling the power means, the initial movement of said element from a position of rest actuating the control means to make the power means effective.

13. Control mechanism comprising a manually shiftable member, actuating linkage connected to be operated by said shiftable member, said linkage including slack take-up means composed of a power section and a second section operated by said power section and shiftable axially with respect thereto, and means connected with the shiftable member to control the operation of the power section in its operation to shift the second section for taking up slack in the linkage, said control means being actuated to make the power means effective upon initial movement of the shiftable member from one extreme position in its range of movement.

MILTON TIBBETTS.